US012579136B2

(12) United States Patent
Yuan et al.

(10) Patent No.: US 12,579,136 B2
(45) Date of Patent: Mar. 17, 2026

(54) SEMANTIC PARSING USING EMBEDDING SPACE REPRESENTATIONS OF EXAMPLE NATURAL LANGUAGE QUERIES

(71) Applicant: GOOGLE LLC, Mountain View, CA (US)

(72) Inventors: Wangqing Yuan, Wilmington, MA (US); Bryan Christopher Horling, Belmont, MA (US)

(73) Assignee: Google LLC, Mountain View, CA (US)

( * ) Notice: Subject to any disclaimer, the term of this patent is extended or adjusted under 35 U.S.C. 154(b) by 115 days.

(21) Appl. No.: 18/103,973

(22) Filed: Jan. 31, 2023

(65) Prior Publication Data

US 2024/0256533 A1     Aug. 1, 2024

(51) Int. Cl.
*G06F 16/2452* (2019.01)
*G06F 40/30* (2020.01)

(52) U.S. Cl.
CPC ........ *G06F 16/24522* (2019.01); *G06F 40/30* (2020.01)

(58) Field of Classification Search
CPC ............................ G06F 16/24522; G06F 40/30
See application file for complete search history.

(56) References Cited

U.S. PATENT DOCUMENTS

| | | | | |
|---|---|---|---|---|
| 11,580,145 | B1 * | 2/2023 | Kumar | .................... G06N 3/092 |
| 11,847,424 | B1 * | 12/2023 | Harkous | ................ G06N 20/00 |
| 11,868,883 | B1 * | 1/2024 | Commons | ........... G06F 16/3344 |
| 2017/0097966 | A1 * | 4/2017 | Kozareva | ............... G06Q 30/02 |
| 2020/0050667 | A1 | 2/2020 | Lin | |
| 2020/0117742 | A1 * | 4/2020 | Huang | .............. G06F 16/24564 |
| 2022/0093088 | A1 * | 3/2022 | Rangarajan Sridhar | ..................... G06F 16/338 |
| 2022/0138432 | A1 | 5/2022 | Galitsky | |
| 2023/0135179 | A1 * | 5/2023 | Mielke | .................. G06N 5/022 704/232 |
| 2023/0186161 | A1 * | 6/2023 | Arthur | .................... G06F 40/58 704/2 |

OTHER PUBLICATIONS

Li, Jing, et al. "A Survey on Deep Learning for Named Entity Recognition." IEEE Transactions on Knowledge and Data Engineering 34.1 (2022): 50. (Year: 2022).*
Cao et al. Feb. 10, 2021, "Automated Query Reformulation for Efficient Search based on Query Logs From Stack Overflow" (Year: 2021).*

(Continued)

*Primary Examiner* — Matthew J Ellis
(74) *Attorney, Agent, or Firm* — Gray Ice Higdon

(57) ABSTRACT

Techniques disclosed herein are directed towards generating structured data output based on processing a natural language user query using a semantic parser model. Many implementations include identifying one or more argument spans in the given natural language user query based on comparing an embedding space representation of a candidate argument with an embedding space representation of an example query, where the example query is provided by a developer. Various implementations include hotfixing an under-triggering model and/or an over-triggering model based on additional or alternative example queries provided by a developer.

12 Claims, 9 Drawing Sheets

(56)             References Cited

OTHER PUBLICATIONS

European Patent Office; International Search Report and Written Opinion issued in Application No. PCT/US2023/028137; 14 pages; dated Sep. 7, 2023.

Si et al., "Learning Disentangled Intent Representations for Zero-shot Intent Detection" arXiv: 201201721v1 [cs.CL] 9 pages, dated Dec. 3, 2020.

European Patent Office, Communication issued in Application No. 24154952.6; 10 pages; dated Mar. 6, 2024.

European Patent Office; Summons issued in Application No. 24154952. 6; 10 pages; dated May 15, 2025.

* cited by examiner

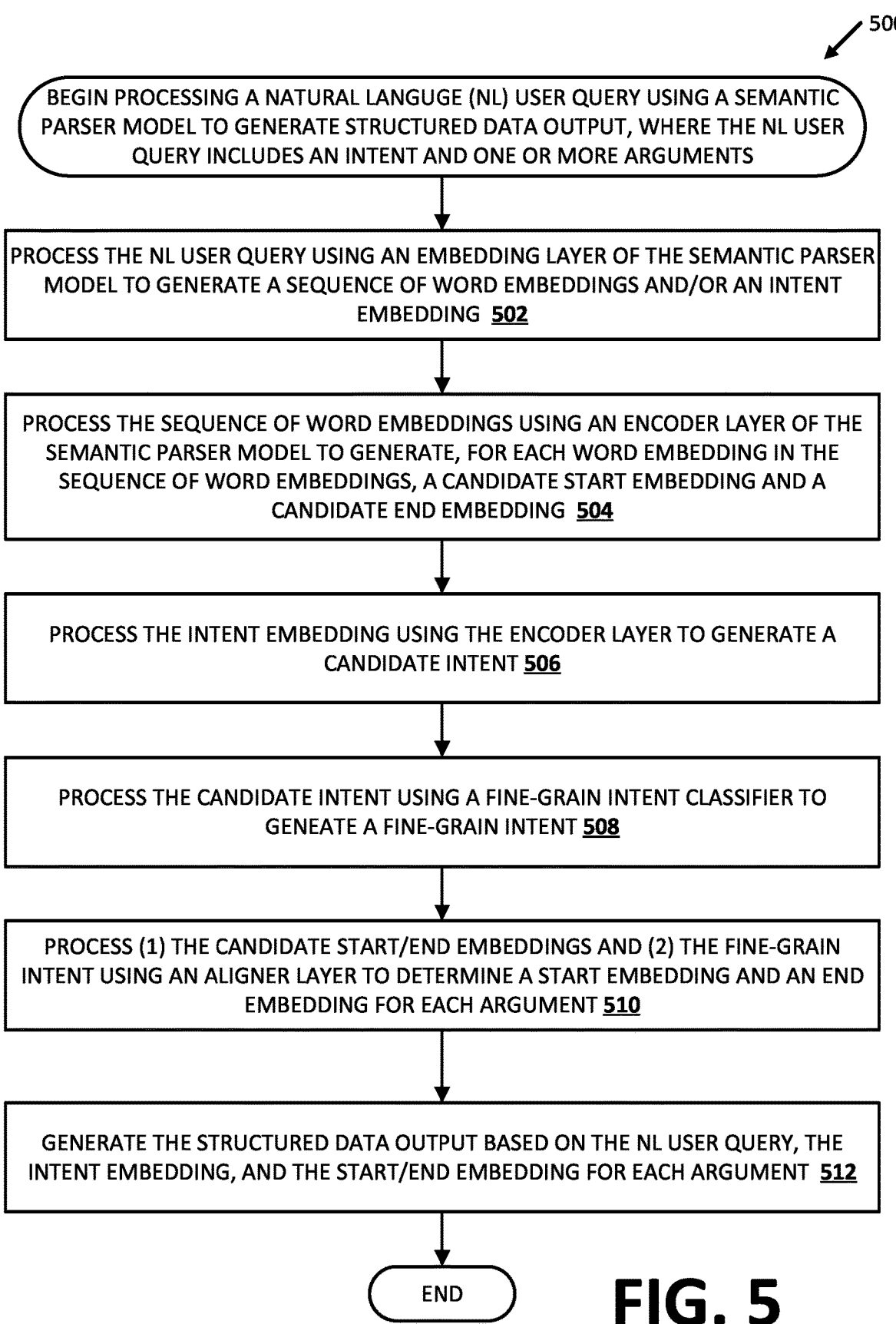

500

BEGIN PROCESSING A NATURAL LANGUGE (NL) USER QUERY USING A SEMANTIC PARSER MODEL TO GENERATE STRUCTURED DATA OUTPUT, WHERE THE NL USER QUERY INCLUDES AN INTENT AND ONE OR MORE ARGUMENTS

PROCESS THE NL USER QUERY USING AN EMBEDDING LAYER OF THE SEMANTIC PARSER MODEL TO GENERATE A SEQUENCE OF WORD EMBEDDINGS AND/OR AN INTENT EMBEDDING 502

PROCESS THE SEQUENCE OF WORD EMBEDDINGS USING AN ENCODER LAYER OF THE SEMANTIC PARSER MODEL TO GENERATE, FOR EACH WORD EMBEDDING IN THE SEQUENCE OF WORD EMBEDDINGS, A CANDIDATE START EMBEDDING AND A CANDIDATE END EMBEDDING 504

PROCESS THE INTENT EMBEDDING USING THE ENCODER LAYER TO GENERATE A CANDIDATE INTENT 506

PROCESS THE CANDIDATE INTENT USING A FINE-GRAIN INTENT CLASSIFIER TO GENEATE A FINE-GRAIN INTENT 508

PROCESS (1) THE CANDIDATE START/END EMBEDDINGS AND (2) THE FINE-GRAIN INTENT USING AN ALIGNER LAYER TO DETERMINE A START EMBEDDING AND AN END EMBEDDING FOR EACH ARGUMENT 510

GENERATE THE STRUCTURED DATA OUTPUT BASED ON THE NL USER QUERY, THE INTENT EMBEDDING, AND THE START/END EMBEDDING FOR EACH ARGUMENT 512

END

FIG. 5

SEMANTIC PARSING USING EMBEDDING SPACE REPRESENTATIONS OF EXAMPLE NATURAL LANGUAGE QUERIES

BACKGROUND

Semantic parsing is the task of converting a natural language utterance into a logical form (i.e., a machine-understandable representation of its meaning). Semantic parsing can be viewed as extracting the precise meaning of an utterance. The many applications of semantic parsing include natural language understanding, machine translation, question answering, ontology induction, automated reasoning, code generation, etc.

SUMMARY

Implementations disclosed herein are directed towards generating structured data output based on processing a natural language user query using a semantic parser model. In some implementations, the semantic parser model can generate an embedding space representation of one or more portions in the natural language user query. For example, each word can be converted into a word embedding using an embedding lookup portion of the semantic parser model. In some implementations, in converting each word into a word embedding the embedding lookup portion can use one or more features of the word such as word id, char ngram, positional embedding, annotation(s) (e.g., knowledge graph entity types), one or more additional or alternative features, and/or combinations thereof. The sequence of word embeddings can be processed using an encoder layer of the semantic parser model to generate an intent embedding. Additionally or alternatively, the sequence of word embeddings can be processed using the encoder layer to generate a candidate start embedding and a candidate end embedding for each word in the sequence of word embeddings. For example, the encoder layer can incorporate contextual information (e.g., nearby words) into one or more of the candidate start embeddings and/or candidate end embeddings.

In some implementations, the system can process the intent embedding using a fine-grain intent classifier portion of the semantic parser model to generate a predicted fine-grain intent corresponding to the natural language user query to identify one or more arguments corresponding to the intent. For example, the natural language user query of "Send the message on my way" has a send intent and a corresponding message argument (e.g., 'on my way'). In contrast, the natural language user query of "send it's cool to Gavin" has the send intent with two corresponding arguments, the message argument (e.g., 'it's cool') and a person argument (e.g., Gavin). In other words, two queries can have the same intent while having a different number of corresponding arguments (e.g., Send [msg] v. Send [person] [msg]).

In some implementations, the system can determine a start embedding and end embedding for each argument using an alignment layer of the semantic parser model. For example, the system can compare the embedding space representations of different combinations of words in the natural language user query with an embedding space representation of a natural language example for the intent. In some implementations, the natural language example can be provided by a developer of an application which utilizes the intent.

For example, the system can process a natural language user query of "what's the weather in New York" using the semantic parser model. In some implementations, the system can generate an embedding space representation of each word in the natural language user query (e.g., an embedding space representation of 'what's', an embedding space representation of 'the', an embedding space representation of 'weather', an embedding space representation of 'in', an embedding space representation of 'New', and/or an embedding space representation of 'York'). Furthermore, the system can process the embedding space representations of the words in the natural language user query using an encoder layer of the semantic parser model to generate a candidate start embedding and a candidate end embedding for each word.

Additionally or alternatively, the system can identify the weather intent of the natural language user query. In some of those implementations, the system can process the embedding space representation of the weather intent using a fine-grain intent classifier to identify one or more arguments that correspond to the given intent. The system can identify an example natural language query corresponding to the intent (e.g., an example query provided by a developer). For example, the system can identify the example query of "weather in Boston" and/or the corresponding start embedding and end embedding for the argument (e.g., the start embedding and end embedding for Boston) In some implementations, for each argument, the system can compare the candidate start embeddings and candidate end embeddings to determine that the predicted argument span of the natural language user query corresponds to the example argument in the example query. For example, the system can compare the distance between an embedding space representation of 'Boston' with an embedding space representation of 'New', an embedding space representation of 'York', and an embedding space representation of 'New York'. In some of those implementations, the system can determine the embedding space representation of 'New York' is the shortest distance from the embedding space representation of the example 'Boston' compared to other embedding space representations of additional or alternative candidate argument span(s) captured in the natural language user query. In other words, based on comparing candidate argument spans in the natural language query of "what's the weather in New York" with the example query of "weather in Boston", the system can determine that the an embedding space representation of the argument span capturing 'New York' is the shortest distance away from the embedding space representation of the argument span of the example 'Boston'. For instance, the distance between the embedding space representation of 'New York' and the embedding space representation of 'Boston' can be 3 units; the distance between embedding space representation of 'New' and the embedding space representation of 'Boston' can be 10 units; and the distance between the embedding space representation of 'York' and the embedding space representation of 'Boston' can be 5 units. Based on comparing the distances (e.g., the 3 units between the embedding space representations of 'New York' and 'Boston', the 10 units between the embedding space representations of 'New' and 'Boston', and the 5 units between the embedding space representation of 'York' and 'Boston'), the system can determinant the candidate argument span of 'New York' is the closest representation of the city 'Boston' in the natural language user query.

In some implementations, the semantic parser model can process compositional queries. For example, the query "weather in the capital of Tennessee" includes an intent of weather with the argument of 'capital of Tennessee', and a sub-intent of 'capital' with the argument 'Tennessee'. In some implementations, the system can process the query "weather in the capital of Tennessee" using the semantic parser model as described above. However, the encoder layer of the semantic parser model can generate a compositional embedding corresponding to each of the word embeddings (in addition to the candidate start embeddings and candidate end embeddings). Subsequent to identifying the start/end embedding span for each argument, the system can determine whether the given argument includes one or more sub-intents based on the corresponding compositional embedding. For example, the system can determine the argument span "capital of Tennessee" corresponds to the weather intent. Based on the compositional embedding, the system can determine "capital of Tennessee" includes a sub-intent. In some implementations, the system can process the argument "capital of Tennessee" using the semantic parser model (e.g., the system can recursively process arguments of each intent and/or sub-intent until the corresponding compositional embeddings indicate there is not a further sub-intent).

In some implementations, the semantic parser model can over-trigger and/or under-trigger based on processing one or more natural language user queries. Retraining the entire semantic parser model in such over-triggering and/or under-triggering situations is computationally intensive and time consuming. In some implementations, one or more additional example natural language queries that correspond to an intent can be added by a developer to reduce over-triggering and/or under-triggering and without retraining the entire semantic parser model.

In some implementations, under-triggering can be decreased by adding an additional positive natural language example. For example, the developer can determine a portion of the embedding space that should map to the intent that is not currently mapping to the intent. The positive example can add the additional portion of the embedding space to the portion of the embedding space corresponding to the intent. For example, assume that the natural language query of "will it rain tomorrow" does not currently map to the portion of the embedding space corresponding to the weather intent. By adding "will it rain tomorrow" as an additional example, the developer can indicate the missing portion of the embedding space. Subsequent to the developer providing the additional example of "will it rain tomorrow", the system can process the natural language query of "will it rain later this week" using the semantic parser model. In some of those implementations, an embedding space representation of "will it rain later this week" can map to the portion of the embedding space added based on the additional example "will it rain tomorrow". In other words, prior to the developer adding the additional positive example the system would not have triggered based on processing the natural language query of "will it rain later this week" (e.g., the system was under-triggering). However, based on the developer adding the additional example of "will it rain tomorrow" (and the mapping additional portion of the embedding space to the weather intent based on the embedding space representation of "will it rain tomorrow"), the developer can provide a hotfix to correct the under-triggering and without the need to retrain the model.

Similarly, in some implementations, over-triggering can be decreased by adding a negative natural language example. For example, the developer can determine a portion of the embedding space that maps to the intent but should not map to the intent. The negative example can delete an additional portion of the embedding space from the portion of the embedding space corresponding to the intent.

For example, assume that the natural language query of "define weather" incorrectly maps to the portion of the embedding space corresponding to the weather intent. By adding "define weather" as a negative example, the developer can indicate the incorrect portion of the embedding space. Subsequent to the developer providing the negative example of "define weather", the system can process the natural language query of "meaning of weather" using the semantic parser model. In some of those implementations, an embedding space representation of "meaning of weather" can map to the portion of the embedding space deleted from the weather intent based on the negative example of "define weather". In other words, prior to the developer adding the negative example the system would have triggered based on processing the natural language query of "meaning of weather" (e.g., the system was over-triggering). However, based on the developer adding the negative example of "define weather" (and deleting the portion of the embedding space of the weather intent based on the embedding space representation of "define weather"), the developer can provide a hotfix to correct the over-triggering without the need to retrain the model.

Accordingly, various implementations set forth techniques for generating structured data output by processing a natural language query using a semantic parser model. The system can identify one or more arguments in the natural language query which correspond to the intent of the natural language query. In some implementations, the system can predict the argument span(s) in the natural language query based on an embedding space representation of one or more example queries. For example, the one or more example queries can be provided by a developer. Developer provided example queries can reduce the number of training instances required to train the semantic parser model. The processing of fewer training instances can lead to faster training of the semantic parser model and/or can save computational resources when training the semantic parser model (e.g., processor cycles, memory, power, battery, etc.).

Additionally or alternatively, developer provided example queries can provide a hotfix for an over-triggering semantic parser model and/or an under-triggering semantic parser model. By providing one or more positive example queries and/or negative example queries, the developer can address over-triggering and/or under-triggering of the semantic parser model without needing to retrain the model. Retraining the entire semantic parser model is time consuming and computationally intensive. Computing resources can be saved by avoiding the need to retrain the entire semantic parser model.

Furthermore, a given semantic parser model can be used by multiple developers for distinct applications and/or skills of those multiple developers. In some implementations, the given semantic parser model may not be trained specifically for any specific developer for a distinct application and/or skill (e.g., the semantic parser model is not trained with training instances specifically targeted towards the distinct application and/or skill). In some implementations, a first developer of a first application can provide one or more example queries corresponding to the first application such that the semantic parser model can be utilized in performance of the first application without any specific training of the given model towards the first application. Similarly, a second developer of a second application can provide one or more example queries corresponding to the second application such that the given semantic parser model can be utilized in the performance of the second application without any specific training of the given model towards the second application. In some of those implementations, the first developer and the second developer can provide the corresponding example queries for use with the same given semantic parser model. In other words, a single semantic parser model can be used in processing queries for multiple different applications based on multiple different sets of developer provided example queries. In some implementations, multiple developers providing multiple sets of example queries directed towards multiple different applications can entirely remove the need to train the semantic parser model with training instances tailored towards the different applications. Computing resources can be saved by eliminating the need to train the semantic parser model for different applications.

The above description is provided only as an overview of some implementations disclosed herein. These and other implementations of the technology are disclosed in additional detail below. It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 is a flowchart illustrating an example process of processing a natural language user query using a semantic parser model to generate structured output in accordance with various implementations disclosed herein.

DETAILED DESCRIPTION

Figures 1A, 1B:
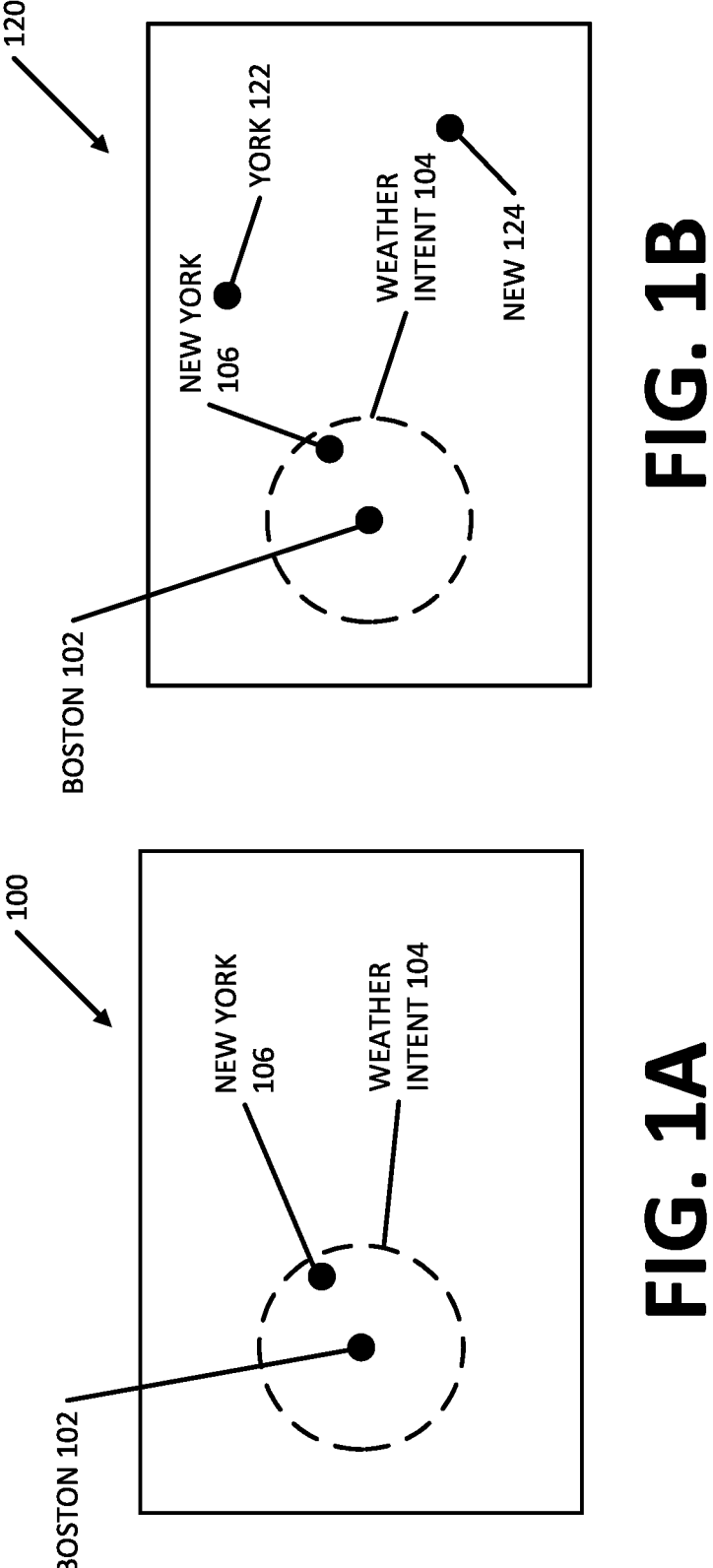
FIGS. 1A and 1B illustrate an example of an embedding space representation of a weather intent in accordance with various implementations disclosed herein.

Turning now to the figures, FIG. 1A illustrates an example 100 of an embedding space. In the illustrated example 100, an embedding space representation of a weather intent 104, where the embedding space representation of the weather intent is at least in part defined by an embedding space representation of a natural language example query "weather in Boston?" 102. In some implementations, "weather in Boston?" has a weather intent and a corresponding argument of 'Boston'. In some of those implementations, the system can process the natural language user query of "what's the weather in New York" using the semantic parsing model to generate output indicating 'New York' 106 is the argument corresponding to 'Boston' in the example query of "weather in Boston".

FIG. 1B illustrates an example 120 of the embedding space. Example 120 includes the embedding space representation corresponding to the example natural language query "weather in Boston" 102 as well as the portion of the embedding space corresponding to the weather intent 104. In some implementations, the system can process the natural language query of "What's the weather in New York" using a semantic parser model. In some of those implementations, the system can determine the argument 'New York' best aligns with the example argument of 'Boston' corresponding to the weather intent.

In some implementations, the system can compare an embedding space representation of 'Boston' 102 with an embedding space representation of 'New York' 106, an embedding space representation of 'York' 122, and an embedding space representation of 'New' 124. In the illustrated example 120, the embedding space representation of 'New York' 106 is within the portion of the embedding space corresponding to the weather intent 104. Additionally or alternatively, they system can calculate the distance between the embedding space representation of 'New York' 106 and the embedding space representation of the developer provided example 'Boston' 102, and compare this with the distance between the embedding space of 'New' 124 and the embedding space representation of 'Boston' 102 as well as the distance between the embedding space representation of 'York' 122 and the embedding space representation of 'Boston' 102. In some of those implementations, the system can determine 'New York' is more similar to 'Boston' than 'New' or 'York' are to 'Boston' based on distance between 'New York' and 'Boston' being smaller than the distance between 'New' and 'Boston' as well as 'York' and 'Boston'. In other words, the system can determine 'New York' and 'Boston' are more similar based on the embedding representations of the city names, despite the city names being different word lengths.

Figure 2:
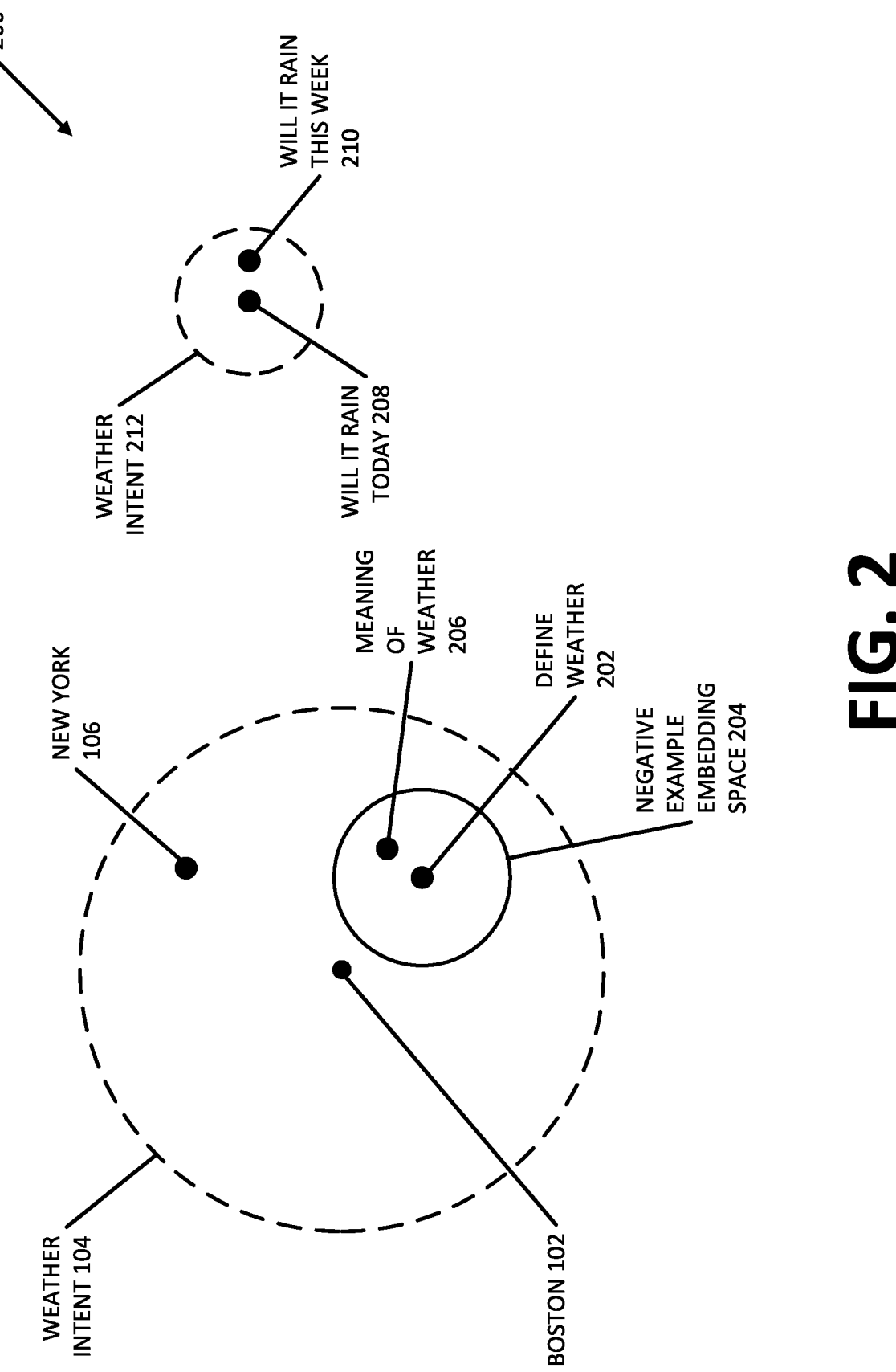
FIG. 2 illustrates an additional example of an embedding space representation of a weather intent in accordance with various implementations disclosed herein.

FIG. 2 illustrates an additional example 200 of embedding space representation of a weather intent. The example 200 includes an embedding space representation of 'Boston' 102, a portion of the embedding space corresponding to a weather intent 102, and an embedding space representation of 'New York' 106 as described above with respect to FIGS. 1A-1B. Additionally, example 200 includes an embedding space representation of the user query "define weather" 202 and an embedding space representation of the user query "will it rain today" 208.

In some implementations, processing the user query of "will it rain today" using the semantic parser model will not correctly trigger the weather intent. In other words, the model will under-trigger when processing the "will it rain today" query. Retraining the entire model is computationally expensive and/or time consuming. In some implementations, a developer can hot fix the weather intent by providing an example query in place of retraining the model. When the system is under-triggering, the developer can provide a positive example, such as "will it rain today". In some implementations, the system can determine the embedding space representation of "will it rain today" 208 is not captured in the portion of the embedding space corresponding to the weather intent 104, where the portion of the embeddings space 104 is defined based on the embedding space representation of the example user query of "weather in Boston" 102.

In some of those implementations, the system can identify a given portion of the embedding space corresponding to the weather intent 212 based on the embedding space representation of "will it rain today" 208, where at least a portion of the given portion of the embedding space corresponding to the weather intent 212 is disjoint from the portion of the embedding space corresponding to the weather intent 104. Additionally or alternatively, the system can add the given portion of the embedding space 212 to the portion of the embedding space corresponding to the weather intent 104 based on the developer adding the natural language example query of "will it rain today". In other words, the developer can provide a hotfix for the under-triggering model (by providing the example query of "will it rain today") without needing to retrain the model. In some implementations, the natural language example query of "will it rain today" is a positive example query.

Subsequent to the developer providing the additional example query as a hotfix to the model under-triggering, the system can identify an additional natural language user query of "will it rain this week". In some implementations, the system can process the additional natural language user query using the semantic parser model to generate structured data output. In some of those implementations, the system can identify the embedding space representation of "will it rain this week" 210. In the illustrated example, the embedding space representation of "will it rain this week" 210 is within the weather intent 212 which was added to the weather intent 104 based on the example query "will it rain today". In other words, the system can identify the natural language query "will it rain this week" corresponds to the weather intent, where the system did not identify that the query "will it rain this week" corresponds to the weather intent before the developer added the example query of "will it rain today".

Additionally or alternatively, example 200 includes an embedding space representation of the user query of "define weather" 202. While the query "define weather" includes the word 'weather', it corresponds to a 'definition' intent and not to the 'weather' intent. In some implementations, processing the user query of "define weather" using the semantic parser model will incorrectly trigger the weather intent. In other words, the model will over-trigger when processing the "define weather" query. In some implementations, the developer can hotfix the weather intent by providing an example query in place of retraining the model. When the system is over-triggering, the developer can provide a negative example, such as "define weather". In some implementations, the system can determine the embedding space representation of "define weather" 202 is incorrectly captured in the portion of the embedding space corresponding to the weather intent 104, where the portion of the embedding space 104 is defined based on the embedding space representation of the example user query of "weather in Boston" 102 as described herein.

In some implementations, the system can identify a given portion of the embedding space which corresponds to the negative example 204, where the negative example embedding space 204 is included in the portion of the embedding space corresponding to the weather intent 104 but does not correspond to the weather intent. Additionally or alternatively, the system can remove the given portion of the negative example of the embedding space 204 corresponding to the define intent (and not the weather intent 104) based on the developer adding the natural language example query of "define weather". In other words, the developer can provide a hotfix for the over-triggering model (by providing the example query of "define weather") without needing to retrain the model. In some implementations, the natural language example query of "define weather" is a negative example query.

Subsequent to the developer providing the additional example query as a hotfix to the model over-triggering, the system can identify an additional language user query of "meaning of weather". In some implementations, the system can process the additional language user query using the semantic parser model to generate structured data output. In some of those implementations, the system can identify the embedding space representation of "meaning of weather" 206. In the illustrated example, the embedding space representation of "meaning of weather" 206 is within the negative example embedding space 204 and is not within the portion of the embedding space corresponding to the weather intent 104 based on the example query "weather in Boston". In other words, the system can identify the natural language user query of "meaning of weather" does not correspond to the weather intent, where the system previously identified the query of "meaning of weather" corresponding to the weather intent before the developer added the example query of "define weather".

Figure 3:
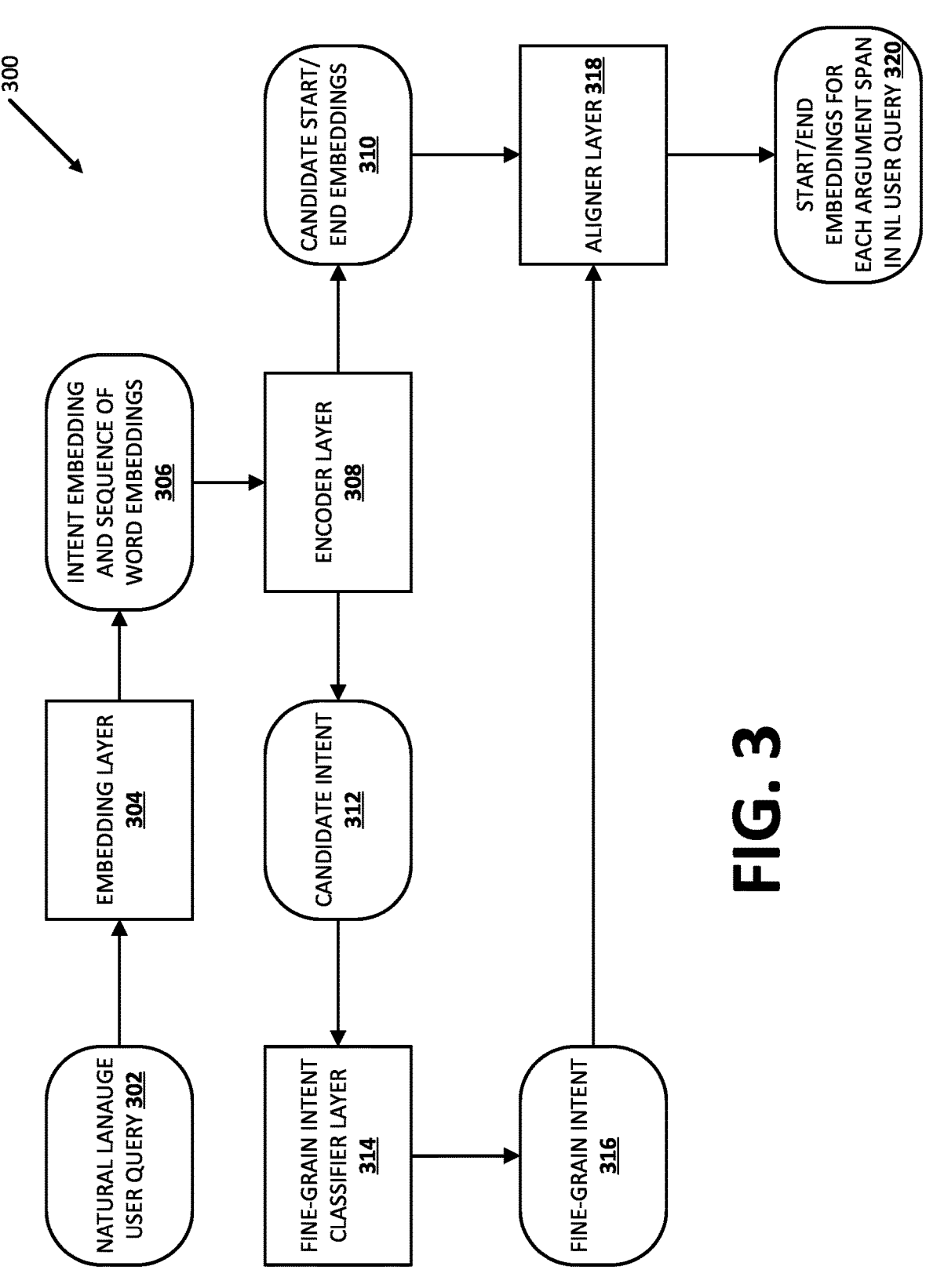
FIG. 3 illustrates an example of processing a natural language user query using a semantic parser model in accordance with various implementations disclosed herein.

FIG. 3 illustrates an example 300 of processing a natural language user query using a semantic parser model in accordance with various implementations disclosed herein. The illustrated example 300 includes a natural language user query 302. In some implementations, the natural language user query 302 can be processed using an embedding layer 304 of the semantic parser model to generate an intent embedding and a sequence of word embeddings 306 based on the natural language user query. For example, the natural language user query 302 can be "what's the weather in New York" as described herein with respect to FIGS. 1A and 1B. The generated intent embedding can correspond to the 'weather' intent, and the sequence of word embeddings can correspond to one or more words in the query "what's the weather in New York".

In some implementations, the intent embedding can be processed using an encoder layer 308 of the semantic parser model to generate a candidate intent 312. The candidate intent 312 and/or the sequence of word embeddings can be processed using a fine-grain intent classifier layer 314 of the semantic parser model to generate a fine-grain intent 316. In some implementations, the fine-grain intent 316 can distinguish between similar intents with different arguments. For example, the weather intent and corresponding user query of "what's the weather in New York" can have a fine-grain intent of 'weather [city]'. In some implementations, the fine-grain intent of 'weather [city]', for example, can be distinguished from the similar weather intent of 'weather [city] [day of the week]' corresponding to the query "what is the weather in New York on Friday".

Additionally or alternatively, the system can process the sequence of word embeddings and/or the intent embedding 306 using the encoder layer 308 to generate one or more candidate start embeddings and one or more candidate end embeddings 310. In some implementations, the system can generate a candidate start embedding and a corresponding candidate end embedding corresponding to each word in the sequence of word embeddings 306. In some implementations, the system can process the candidate start/end embeddings 310 and the fine-grain intent 316 using an aligner layer 318 of the semantic parser mode, to generate a predicted start embedding and a predicted end embedding for each argument span in the natural language user query 320. For example, the system can generate a start embedding and end embedding for the [city] argument span of in the natural language query of "what's the weather in New York", where the start embedding can indicate the beginning of the word 'New' and the end embedding can indicate the end of the word 'York'.

Figure 4:
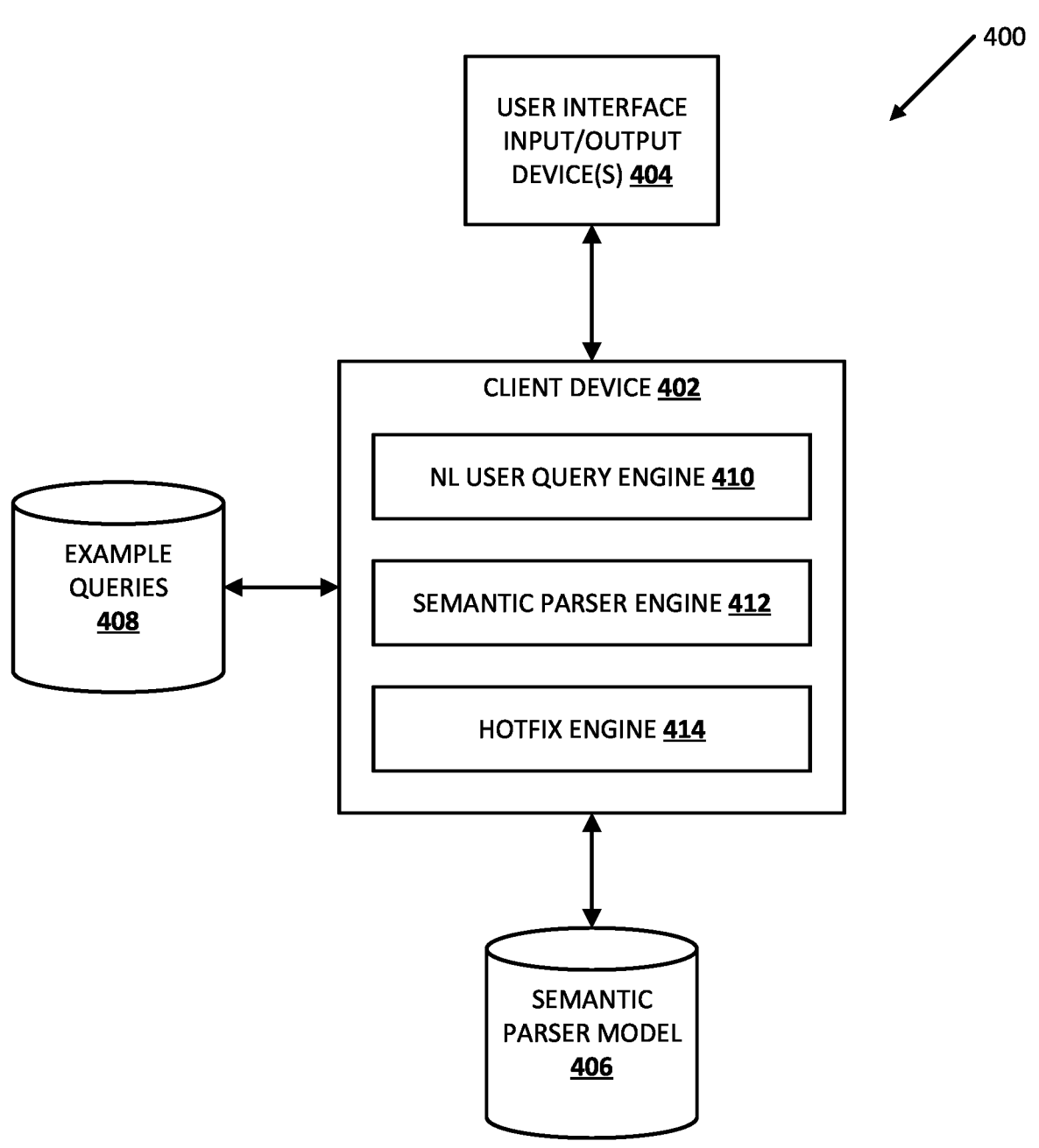
FIG. 4 is a block diagram illustrating an example environment in which various implementations disclosed herein may be implemented.

FIG. 4 illustrates a block diagram of an example environment 400 in which implementations disclosed herein may be implemented. The example environment 400 includes a client device 402 which can include one or more user interface input/output devices 404, a NL user query engine 410, a semantic parser engine 412, a hotfix engine 414, one or more additional or alternative engines (not depicted), and/or combinations thereof. Additionally or alternatively, the client device 402 may be associated with semantic parser model 406, example queries 408, one or more additional or alternative components (not depicted), and/or combinations thereof.

In some implementations, the client device 402 may be include one or more user interface input/output devices 504, which may include, for example, a physical keyboard, a touch screen (e.g., implementing a virtual keyboard or other textual input mechanisms), a microphone, a camera, a display screen, and/or speaker(s). The user interface input/output devices may be incorporated with one or more computing systems of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of the client device 402 may be implemented on a computing system that also contains the user interface input/output devices.

Some non-limiting examples of the client device 402 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. The client device 402 may include one or more memories for storage of data and software applications, one or more processors for accessing data and executing applications, and other components that facilitate communication over a network. The operations performed by the client device 402 may be distributed across multiple computing devices. For example, computing programs running on one or more computers in one or more locations can be coupled to each other through a network.

In some implementations, the natural language user query engine 410 can identify a natural language user query for processing. In some of those implementations, the natural language user query engine 410 can identify a natural language user query captured via one or more user interface input devices 404, such as via one or more microphones (not depicted).

In some implementations, the semantic parser engine 412 can process a given natural language user query (such as a given natural language user query identified using natural language user query engine 410) using the semantic parser model 406 to generate structured output corresponding to the given natural language user query. Additionally or alternatively, the system can use one or more embedding space representations of one or more corresponding developer provided example queries 408 in determining an intent of the given natural language user query. For example, the semantic parser engine 412 can generate structured data output for the given natural language user query in accordance with process 500 described herein.

In some implementations, the hotfix engine 414 can determine whether the semantic parser model 406 is under-triggering and/or over-triggering. If the system determines the semantic parser model 406 is under-triggering and/or over-triggering, a developer can provide one or more additional example queries 408 to hotfix the under-triggering and/or over-triggering. For example, the hotfix engine 414 can determine whether the semantic parser model 406 is under-triggering in accordance with process 600 described herein. Additionally or alternatively, the hotfix engine 414 can determine whether the semantic parser model 406 is over-triggering in accordance with process 700 described herein.

FIG. 5 is a flowchart illustrating an example process of 500 of processing a natural language user query using a semantic parser model to generate structured data output in accordance with various implementations disclosed herein. For convenience, the operations of the flowchart are described with reference to a system that performs the operations. This system may include various components of various computer systems, such as one or more components of client device 402 and/or computing system 910. Moreover, while operations of process 500 are shown in a particular order, this is not meant to be limiting. One or more operations may be reordered, omitted, and/or added.

The system begins processing a natural language user query using a semantic parser model to generate structured data output. In some implementations the natural language user query includes an intent and one or more arguments. For example, the natural language user query of "send meet you tomorrow as a reply" includes a 'send' intent and a message argument of 'meet you tomorrow'. Additionally or alternatively, the natural language user query of "message James that lunch is ready" includes the same 'send' intent as the previous example, but includes two arguments, a message argument of 'lunch is ready' and a person argument of 'James'. In other words, the system can process variations of a given intent, where the variations can have different argument(s), different number(s) of arguments, additional or alternative variation(s) in arguments, and/or combinations thereof. The natural language user query can be captured via one or more user interface input devices 404 as described herein with respect to FIG. 4.

At block 502, the system processes the natural language user query using an embedding layer of a semantic parser model to generate a sequence of word embeddings and/or an intent embedding. In some implementations, the semantic parser model can process a sequence of tokens (e.g., a representation of the natural language user query) using the embedding layer to convert each word into a word embedding. In some of those implementations, the words can be converted into word embeddings via an embedding lookup using one or more features of the words, where the system processes the one or more features and identifies the corresponding word embedding based on the one or more features.

For instance, the words can be converted into word embeddings via an embedding lookup using one or more word features such as a word id, an n-gram (e.g., a sequence of n items from a natural language query such as a sequence of n characters, a sequence of n phonemes, a sequence of n syllables, a sequence of n characters, a sequence of n letters, a sequence of n words, etc.), one or more positional embeddings (e.g., the location or position of a word in a sequence such that each position is assigned a unique word in the natural language query), one or more annotations (e.g., knowledge graph entity types), one or more additional or alternative features, and/or combinations thereof. For example, the system can process the natural language user query 302 using the embedding layer 304 to generate the intent embedding the sequence of word embeddings 306 as described herein with respect to FIG. 3.

At block 504, the system processes the sequence of word embeddings using an encoder layer of the semantic parser model. In some implementations, the system generates, for each word embedding in the sequence of word embeddings, a candidate start embedding and a candidate end embedding. In some implementations, the encoder layer can incorporate contextual information (e.g., nearby words) when generating the candidate start embedding and candidate end embedding for each word embedding. In some of those implementations, the encoder layer can include a transformer model, a convolutional neural network model, a long short term memory model, one or more additional or alternative models, and/or combinations thereof. For example, the system can process the sequence of word embeddings 306 using encoder layer 308 to generate candidate start embeddings and candidate end embeddings 310 as described herein with respect to FIG. 3.

At block 506, the system can process the intent embedding (or the embedding space representation of the intent) using the encoder layer to generate a candidate intent. In some implementations, the encoder layer can incorporate contextual information (e.g., nearby words) when generating the intent embedding. In some of those implementations, the encoder layer can include a transformer model, a convolutional neural network model, a long short term memory model, one or more additional or alternative models, and/or combinations thereof. For example, the system can process the intent embedding 306 using the encoder layer 308 to generate the candidate intent 312 as described herein with respect to FIG. 3.

At block 508, the system processes the candidate intent using a fine-grain intent classifier to generate a fine-grain intent. In some implementations, the fine-grain intent classifier can identify one or more arguments corresponding to the candidate intent. In some implementations, for an intent with arguments, a fine-grain intent embedding can be determined based on the summation of the intent embedding and the one or more argument embeddings. For example, the system can process the candidate intent 312 using the fine-train intent classifier layer 314 to generate the fine-grain intent 316 described herein with respect to FIG. 3.

At block 510, the system can process (1) the candidate start embeddings and the candidate end embeddings and (2) the fine-grain intent using an aligner layer to determine a start embedding and an end embedding for each argument in the natural language query. In some implementations, the aligner layer can include a dot product portion and a softmax portion. In some of those implementations, the aligner layer can predict which candidate start embeddings and candidate end embeddings are best aligned with each argument type. For example, the system can process the candidate start/end embeddings 310 and the fine-grain intent 316 using the aligner layer 318 to determine the start/end embedding for each argument span in the natural language user query 320 as described herein with respect to FIG. 3.

At block 512, the system generates the structured data output based on the natural language user query, the intent embedding, and the start/end embedding for each argument.

In some implementations, the natural language user query can include a compositional query. A compositional query can include one or more sub-intents as the argument of an intent. For example, "what is the weather in the capital of Tennessee" is a compositional query, where the weather intent has a city argument of 'capital of Tennessee'. Additionally or alternatively, 'capital of Tennessee' includes the sub-intent of capital with a state argument. In some implementations, processing the sequence of word embeddings using the encoder layer can generate a conditional embedding for each word in the sequence of word embeddings (where the conditional embedding is in addition to the candidate start/end embeddings). After the system generates the start embedding and end embedding for each argument span in the natural language user query (e.g., after the system processes the candidate start/end embeddings and the fine-grain intent using the aligner layer of the semantic parser model) the compositional embedding corresponding each argument start embedding can be processed using a compositional classifier to generate output predicting whether the corresponding argument span is a sub-intent. If so, the argument span including the sub-intent can be processed using the semantic parser model. In other words, if the system determines one or more argument spans in the natural language user query include a sub-intent, the system can recursively process the argument span which includes the sub-intent. In some of those implementations, the system can recursively process portion(s) of the natural language user query until the system determines there are no remaining sub-intents in any of the argument spans.

Figure 6:
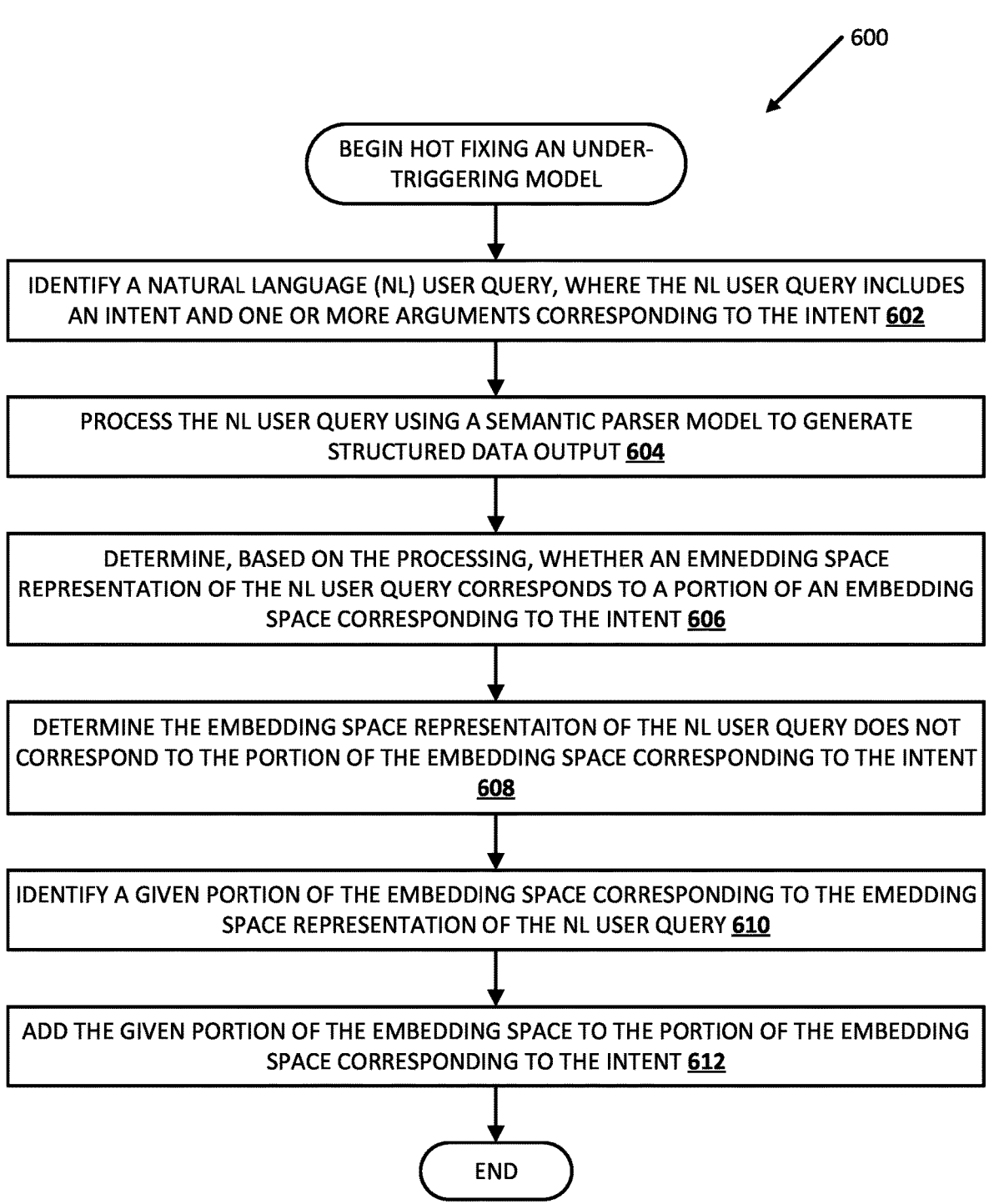
FIG. 6 is a flowchart illustrating an example process of hot fixing an under-triggering model in accordance with various implementations disclosed herein.

FIG. 6 is a flowchart illustrating an example process of 600 of hot fixing an under-triggering model in accordance with various implementations disclosed herein. For convenience, the operations of the flowchart are described with reference to a system that performs the operations. This system may include various components of various computer systems, such as one or more components of client device 402 and/or computing system 910. Moreover, while operations of process 600 are shown in a particular order, this is not meant to be limiting. One or more operations may be reordered, omitted, and/or added.

The system begins hot fixing an under-triggering model. For example, the system can hot fix an under-triggering semantic parser model described herein with respect to FIG. 2.

At block 602, the system identifies a natural language user query, where the natural language user query includes an intent and one or more arguments corresponding to the intent. For example, the system can identify the natural language query of "will it rain today" which includes a weather intent and a day of the week argument.

At block 604, the system processes the natural language user query using a semantic parser model to generate structured data output. In some implementations, the system can process the natural language user query using the semantic parser model to generate the structured data output in accordance with process 500 of FIG. 5 described herein.

At block 606, the system determines, based on the processing at block 604, whether an embedding space representation of the natural language user query corresponds to a portion of an embedding space corresponding to the intent.

At block 608, the system determines the embedding space representation of the natural language user query does not correspond to the portion of the embedding space corresponding to the intent. In other words, the system can determine the weather intent is under-triggering. For example, the system can process the embedding space representation of 'will it rain tomorrow' 208 and determine it does not correspond to the portion of the embedding space corresponding to the weather intent 104 as described herein with respect to FIG. 2.

At block 610, the system identifies a given portion of the embedding space corresponding to the embedding space representation of the natural language user query. For example, the system can identify a given portion of the embedding space corresponding to the weather intent 212 based on the embedding space representation of 'will it rain today' 208 as described herein with respect to FIG. 2.

At block 610, the system adds the given portion of the embedding space to the portion of the embedding space corresponding to the intent. In some implementations, the given portion of the embedding space can be added to the portion of the embedding space corresponding to the intent based on a developer providing an additional natural language example query. In some of those implementations, the additional natural language example query is a positive example. For example, the developer can provide the example query of "will it rain today" to add the portion of the embedding space corresponding to the example query 212 to the portion of the embedding space corresponding to the weather intent 104 as described herein within with respect to FIG. 2.

In some implementations, the developer providing an example query for a model that is under-triggering can provide a hotfix to the model, where the portion(s) of the embedding space corresponding to a given intent can be updated based on the additional example query without needing to retrain the model.

Figure 7:
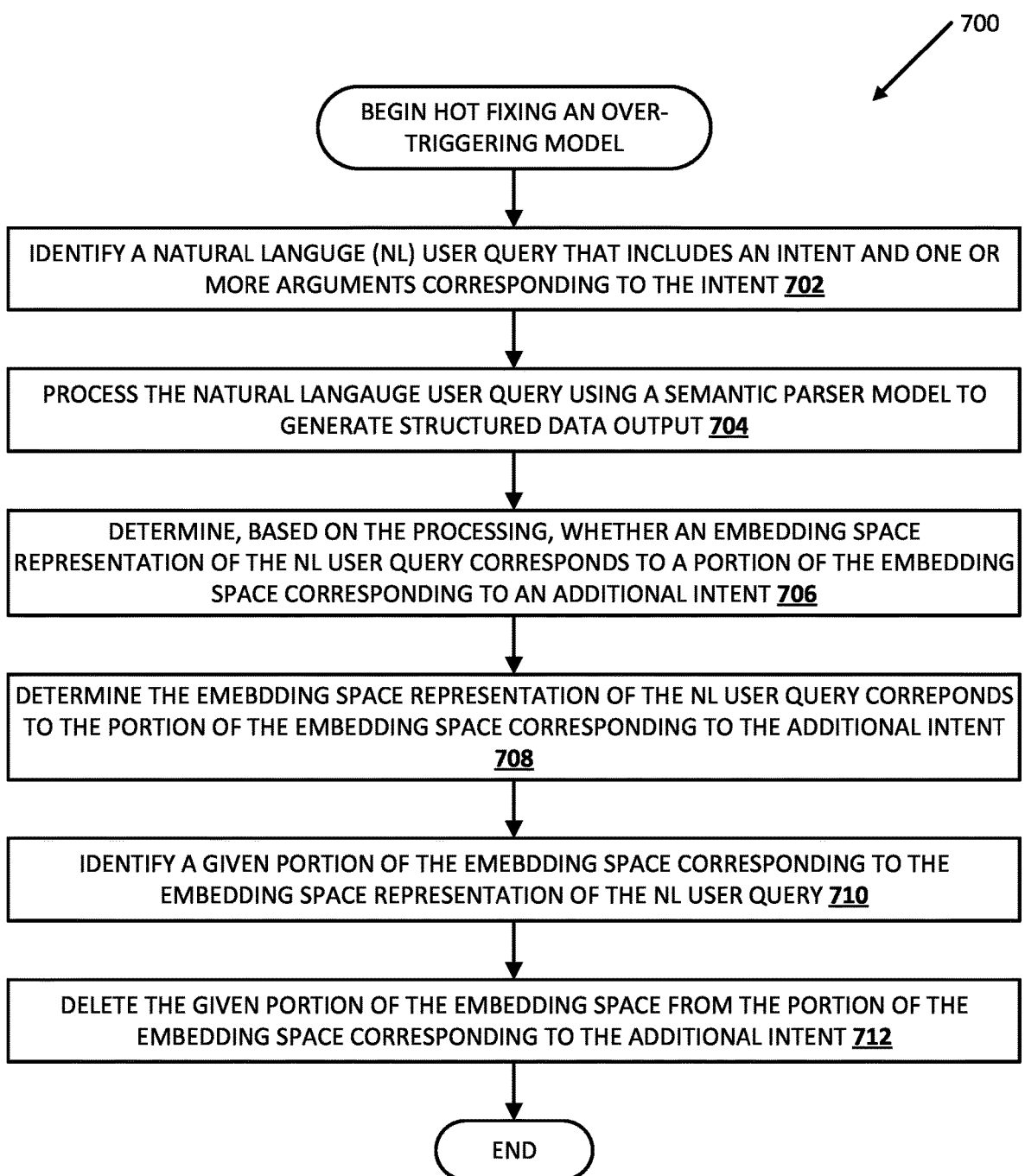
FIG. 7 is a flowchart illustrating an example process of hot fixing an over-triggering model in accordance with various implementations disclosed herein.

FIG. 7 is a flowchart illustrating an example process of 700 of hot fixing an over-triggering model in accordance with various implementations disclosed herein. For convenience, the operations of the flowchart are described with reference to a system that performs the operations. This system may include various components of various computer systems, such as one or more components of client device 400 and/or computing system 910. Moreover, while operations of process 700 are shown in a particular order, this is not meant to be limiting. One or more operations may be reordered, omitted, and/or added.

The system begins hot fixing an over-triggering model. In some implementations, the system begins hot fixing an over-triggering semantic parser model described herein with respect to FIG. 2.

At block 702, the system identifies a natural language user query that includes an intent and one or more arguments corresponding to the intent. For example, the system can identify a natural language user query of "define weather" which includes a definition intent and a word to define argument.

At block 704, the system processes the natural language user query using a semantic parser model to generate structured data output. In some implementations, the system can process the natural language user query using the semantic parser model to generate the structured data output in accordance with process 500 of FIG. 5 described herein.

At block 706, the system determines, based on the processing at block 704, whether an embedding space representation of the natural language user query corresponds to a portion of the embedding space corresponding to an additional intent.

At block 708, the system determines the embedding space representation of the natural language user query corresponds to the portion of the embedding space corresponding to the additional intent. In other words, the system can determine the weather intent is over-triggering. For example, the system can process the embedding space representation of 'define weather' 202 and determine it incorrectly is within the portion of the embedding corresponding to the weather intent 104 as described herein with respect to FIG. 2.

At block 710, the system identifies a given portion of the embedding space corresponding to the embedding space representation of the natural language user query and/or corresponding to the intent of the natural language user query. For example, the system can identify a given portion of the embedding space 204 corresponding to the embedding space representation of 'define weather' 202, where the given portion of the embedding space 204 is within the portion of the embedding space corresponding to the weather intent 104 as described herein with respect to FIG. 2.

At block 712, the system deletes the given portion of the embedding space corresponding to the intent of the natural language query from the portion of the embedding space corresponding to the additional intent. In some implementations, the given portion of the embedding space can be deleted from the portion of the embedding space corresponding to the incorrect intent based on an example query provided by a developer. In some of those implementations, the example query provided by the developer can be a negative example. For example, the developer can provide the example query of "define weather" to delete the portion of the embedding space 204 corresponding to the embedding space representation of 'define weather' 202 from the portion of the embedding space corresponding to the weather intent 104 as described herein with respect to FIG. 2.

In some implementations, the developer providing an example query for a model that is over-triggering can provide a hotfix to the model, where the portion(s) of the embedding space corresponding to a given intent can be removed from the portion of the embedding space corresponding to an incorrect intent based on the additional example query without needing to retrain the model.

Figure 8:
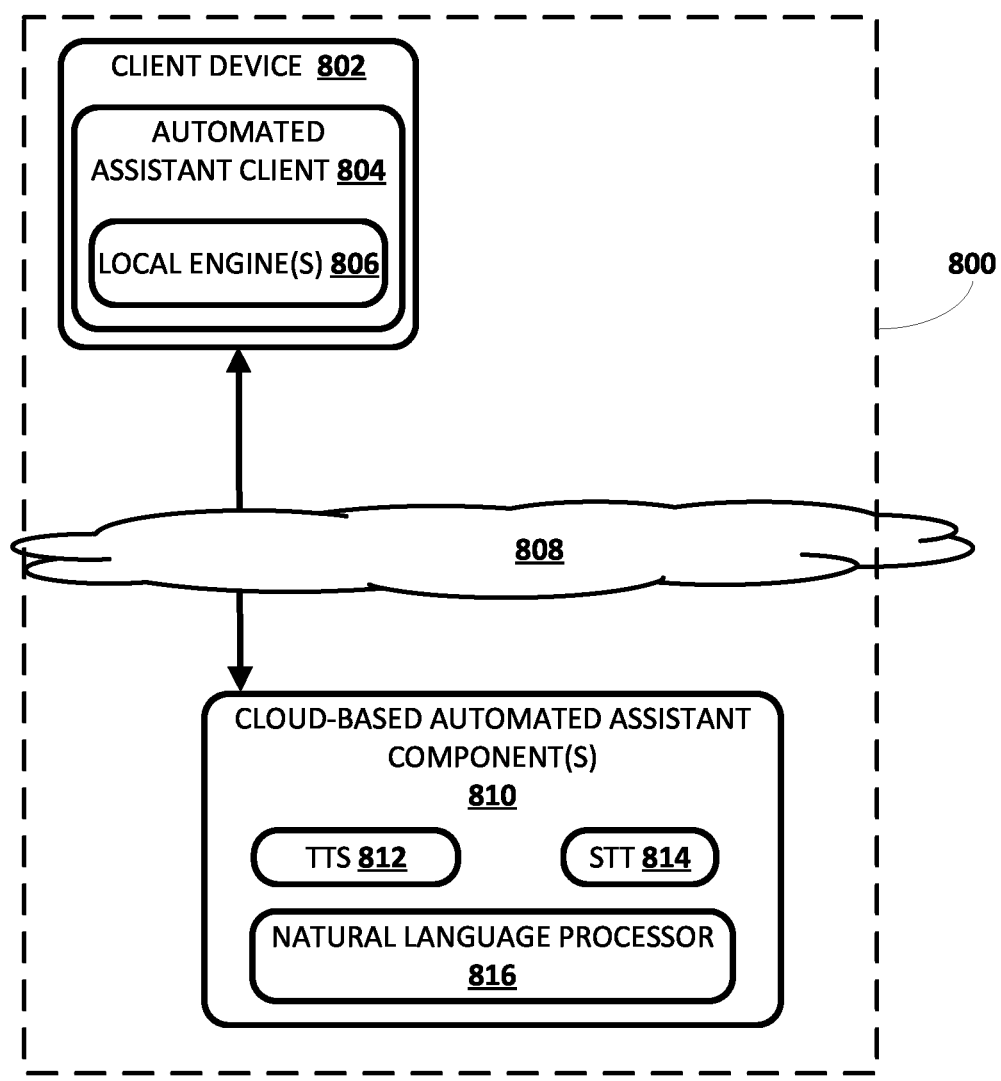
FIG. 8 illustrates a block diagram of another example environment in which implementations disclosed herein may be implemented.

Turning now to FIG. 8, an example environment is illustrated where various implementations can be performed. FIG. 8 is described initially, and includes a client computing device 802, which executes an instance of an automated assistant client 804. One or more cloud-based automated assistant components 810 can be implemented on one or more computing systems (collectively referred to as a "cloud" computing system) that are communicatively coupled to client device 802 via one or more local and/or wide area networks (e.g., the Internet) indicated generally at 808.

An instance of an automated assistant client 804, by way of its interactions with one or more cloud-based automated assistant components 810, may form what appears to be, from the user's perspective, a logical instance of an automated assistant 800 with which the user may engage in a human-to-computer dialog. An instance of such an automated assistant 800 is depicted in FIG. 8. It thus should be understood that in some implementations, a user that engages with an automated assistant client 804 executing on client device 802 may, in effect, engage with his or her own logical instance of an automated assistant 800. For the sake of brevity and simplicity, the term "automated assistant" as used herein as "serving" a particular user will often refer to the combination of an automated assistant client 804 executing on a client device 802 operated by the user and one or more cloud-based automated assistant components 810 (which may be shared amongst multiple automated assistant clients of multiple client computing devices). It should also be understood that in some implementations, automated assistant 800 may respond to a request from any user regardless of whether the user is actually "served" by that particular instance of automated assistant 800.

The client computing device 802 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 802 may optionally operate one or more other applications that are in addition to automated assistant client 804, such as a message exchange client (e.g., SMS, MMS, online chat), a browser, and so forth. In some of those various implementations, one or more of the other applications can optionally interface (e.g., via an application programming interface) with the automated assistant 800, or include their own instance of an automated assistant application (that may also interface with the cloud-based automated assistant component(s) 810).

Automated assistant 800 engages in human-to-computer dialog sessions with a user via user interface input and output devices of the client device 802. To preserve user privacy and/or to conserve resources, in many situations a user must often explicitly invoke the automated assistant 800 before the automated assistant will fully process a spoken utterance. The explicit invocation of the automated assistant 800 can occur in response to certain user interface input received at the client device 802. For example, user interface inputs that can invoke the automated assistant 800 via the client device 802 can optionally include actuations of a hardware and/or virtual button of the client device 802. Moreover, the automated assistant client can include one or more local engines 806, such as an invocation engine that is operable to detect the presence of one or more spoken invocation phrases. The invocation engine can invoke the automated assistant 800 in response to detection of one of the spoken invocation phrases. For example, the invocation engine can invoke the automated assistant 800 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 802, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 800. As used herein, "invoking" the automated assistant 800 can include causing one or more previously inactive functions of the automated assistant 800 to be activated. For example, invoking the automated assistant 800 can include causing one or more local engines 806 and/or cloud-based automated assistant components 810 to further process audio data frames based on which the invocation phrase was detected, and/or one or more following audio data frames (whereas prior to invoking no further processing of audio data frames was occurring). For instance, local and/or cloud-based components can process captured audio data using a two-pass ASR model in response to invocation of the automated assistant 800.

The one or more local engine(s) 806 of automated assistant 800 are optional, and can include, for example, the pairing engine described above, the media playback engine described above, the query engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 802 is relatively constrained in terms of computing resources (e.g., processor cycles, memory, battery, etc.), the local engines 806 may have limited functionality relative to any counterparts that are included in cloud-based automated assistant components 810.

Cloud-based automated assistant components 810 leverage the virtually limitless resources of the cloud to perform more robust and/or more accurate processing of audio data, and/or other user interface input, relative to any counterparts of the local engine(s) 806. Again, in various implementations, the client device 802 can provide audio data and/or other data to the cloud-based automated assistant components 810 in response to the invocation engine detecting a spoken invocation phrase, or detecting some other explicit invocation of the automated assistant 800.

The illustrated cloud-based automated assistant components 810 include a cloud-based TTS module 812, a cloud-based STT module 814, a natural language processor 816, a dialog state tracker 818, and a dialog manager 820. In some implementations, one or more of the engines and/or modules of automated assistant 800 may be omitted, combined, and/or implemented in a component that is separate from automated assistant 800. Further, in some implementations automated assistant 800 can include additional and/or alternative engines and/or modules. Cloud-based STT module 814 can convert audio data into text, which may then be provided to natural language processor 816.

Cloud-based TTS module 812 can convert textual data (e.g., natural language responses formulated by automated assistant 800) into computer-generated speech output. In some implementations, TTS module 812 may provide the computer-generated speech output to client device 802 to be output directly, e.g., using one or more speakers. In other implementations, textual data (e.g., natural language responses) generated by automated assistant 800 may be provided to one of the local engine(s) 806, which may then convert the textual data into computer-generated speech that is output locally.

Natural language processor 816 of automated assistant 800 processes free form natural language input and generates, based on the natural language input, annotated output for use by one or more other components of the automated assistant 800. For example, the natural language processor 816 can process natural language free-form input that is textual input that is a conversion, by STT module 814, of audio data provided by a user via client device 802. The generated annotated output may include one or more annotations of the natural language input and optionally one or more (e.g., all) of the terms of the natural language input.

In some implementations, the natural language processor 816 is configured to identify and annotate various types of grammatical information in natural language input. In some implementations, the natural language processor 816 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 816 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 816 may rely on annotations from one or more other components of the natural language processor 816. In some implementations, in processing a particular natural language input, one or more components of the natural language processor 816 may use related prior input and/or other related data outside of the particular natural language input to determine one or more annotations.

Figure 9:
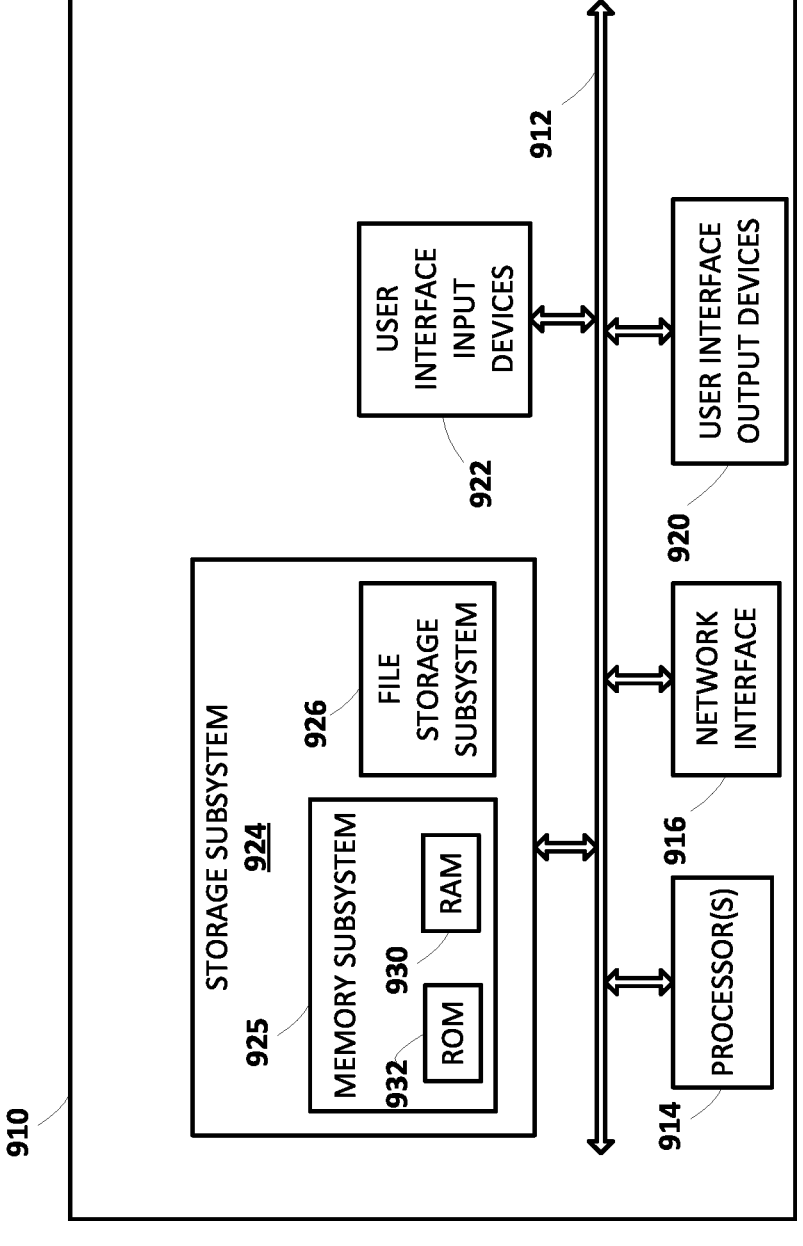
FIG. 9 illustrates an example architecture of a computing device.

FIG. 9 is a block diagram of an example computing device 910 that may optionally be utilized to perform one or more aspects of techniques described herein. In some implementations, one or more of a client computing device, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the process of FIG. 5, FIG. 6 and/or FIG. 7, as well as to implement various components depicted in FIG. 4 and/or FIG. 8.

These software modules are generally executed by processor 914 alone or in combination with other processors. Memory 925 used in the storage subsystem 924 can include a number of memories including a main random access memory ("RAM") 930 for storage of instructions and data during program execution and a read only memory ("ROM") 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors provided, the method includes identifying a natural language user query, where the natural language query includes an intent and one or more arguments. In some implementations, the method further includes processing the natural language user query using a semantic parser model to generate a structured data output based on the natural language user query. In some implementations, processing the natural language user query using the semantic parser model to generate the structured data output includes processing the natural language user query using an embedding layer of the semantic parser model to generate a sequence of word embeddings based on the natural language user query. In some implementations, the method further includes processing the sequence of word embeddings using an encoder layer of the semantic parser model to generate, for each word embedding in the sequence of word embeddings, a candidate start embedding and a candidate end embedding. In some implementations, the method further includes processing the intent of the natural language user query using the encoder layer of the semantic parser model to generate an intent embedding. In some implementations, the method further includes processing the candidate start embeddings and the candidate end embeddings to determine a start embedding and an end embedding for each argument. In some implementations, the method further includes generating the structured data output based on the natural language user query, the intent embedding, and the start embedding and the end embedding corresponding to each argument.

These and other implementations of the technology can include one or more of the following features.

In some implementations, processing the candidate start embeddings and the candidate end embeddings to determine the start embedding and the end embedding for each argument includes, for each argument, comparing one or more of the candidate start embeddings and one or more of the candidate end embeddings with an example embedding that provides a natural language example of the argument. In some implementations, the method further includes selecting the start embedding and the end embedding for the argument based on the comparing. In some versions of those implementations, the natural language example on which the example embedding is based is provided by a developer of a given agent corresponding to the intent of the natural language user query, wherein the natural language example is provided by the developer of the given agent based on determining the natural language user query is directed towards the given agent. In some versions of those implementations, prior to identifying the natural language user query, the method further includes receiving, from the developer of the given agent, the natural language example.

In some implementations, subsequent to processing the intent of the natural language user query using the encoder layer of the semantic parser model to generate an intent embedding, and prior to processing the candidate start embeddings and the candidate end embeddings to determine the start embedding and the end embedding for each argument type, the method further includes processing the intent embedding using a fine-grain intent classifier to identify the arguments corresponding to the intent.

In some implementations, processing the sequence of word embeddings using the encoder layer of the semantic parser model further includes generating, for each word embedding in the sequence of word embeddings, a candidate compositional embedding. In some versions of those implementations, generating the structured data output based on the natural language user query, the intent of the natural language user query, and the start embedding and the end embedding corresponding to each argument further includes, for each argument, processing the candidate compositional embedding using a compositional classifier layer of the semantic parser model to generate predicted output indicating whether the argument includes a sub-intent and one or more sub-arguments. In some implementations, in response to determining the predicted output for each argument indicates the argument does not include the sub-intent and the one or more sub-arguments, the method further includes generating the structured data output based on the natural language user query, the intent of the natural language user query, and the start embedding and the end embedding corresponding to each argument.

In some implementations, generating the structured data output based on the natural language user query, the intent of the natural language user query, and the start embedding and the end embedding corresponding to each argument further includes, for each argument, processing the candidate compositional embedding using a compositional classifier layer of the semantic parser model to generate predicted output indicating whether the argument includes a sub-intent and one or more sub-arguments. In some implementations, in response to determining the predicted output for at least one of the arguments indicates the argument includes a corresponding sub-intent and the one or more corresponding sub-arguments, the method further includes processing the sub-intent and the one or more corresponding sub-arguments using the embedding layer of the semantic parser model to generate a further sequence of word embeddings based on the sub-intent and the one or more sub-arguments. In some implementations, the method further includes processing the further sequence of word embeddings using the encoder layer of the semantic parser model to generate, for each word embedding in the further sequence of word embeddings, a further candidate start embedding, a further candidate end embedding, and a further candidate compositional embedding. In some implementations, the method further includes processing the sub-intent using the encoder layer of the semantic parser model to generate a sub-intent embedding. In some implementations, the method further includes processing the further candidate start embeddings and the further candidate end embeddings to determine a further start embedding and a further end embedding for each sub-argument. In some implementations, the method further includes generating further structured data output based on the sub-intent and the further start embedding and the further end embedding for each sub-argument.

In some implementations, the method further includes transmitting the structured data output to an agent to cause the agent to perform one or more actions responsive to the natural language user query.

In some implementations, a method implemented by one or more processors is provided, the method includes identifying a natural language user query, where the query includes an intent and one or more arguments corresponding to the intent. In some implementations, the method further includes processing the natural language user query using a semantic parser model to generate structured data output. In some implementations, the method further includes determining, based on processing the natural language user query using the semantic parser model, whether an embedding space representation of the natural language user query corresponds to a portion of an embedding space corresponding to the intent. In some implementations, in response to determining the embedding space representation of the natural language user query does not correspond to the portion of the embedding space corresponding to the intent, the method further includes identifying a given portion of the embedding space corresponding to the embedding space representation of the natural language user query. In some implementations, the method further includes altering the portion of the embedding space corresponding to the intent based on the given portion of the embedding space corresponding to the embedding space representation of the natural language user query.

These and other implementations of the technology can include one or more of the following features.

In some implementations, the natural language user query is a positive example query provided by a human developer. In some versions of those implementations, prior to identifying the natural language user query, the method further includes identifying the semantic parser model is under-triggering for a corresponding agent. In some implementations, the method further includes causing a prompt to be displayed to the human developer indicating the semantic parser model is under-triggering. In some implementations, the method further includes identifying the natural language user query based on the positive example query, where the human developer provides the positive example query based on the prompt indicating the semantic parser model is under-triggering.

In some implementations, altering the portion of the embedding space corresponding to the intent based on the given portion of the embedding space corresponding to the embedding space representation of the natural language user query includes adding the given portion of the embedding space to the portion of the embedding space corresponding to the intent. In some versions of those implementations, subsequent to adding the given portion of the embedding space to the portion of the embedding space corresponding to the intent, without retraining the semantic parser model, the method further includes identifying an additional natural language user query, where the query includes the intent and one or more arguments corresponding to the intent. In some implementations, the method further includes processing the additional natural language user query using the semantic parser model to generate additional structured data output. In some implementations, the method further includes determining, based on processing the additional natural language user query using the semantic parser model, an additional embedding space representation of the additional natural language user query corresponds to the given portion of the embedding space representation added to the portion of the embedding space corresponding to the intent.

In some implementations, a method implemented by one or more processors is provided, the method includes identifying a natural language user query, where the query includes an intent and one or more arguments corresponding to the intent. In some implementations, the method further includes processing the natural language user query using a semantic parser model to generate structured data output. In some implementations, the method further includes determining, based on processing the natural language user query using the semantic parser model, whether an embedding space representation of the natural language user query corresponds to a portion of the embedding space corresponding to an additional intent. In some implementations, in response to determining the embedding space representation of the natural language user query corresponds to the portion of the embedding space corresponding to the additional intent, the method further includes identifying a given portion of the embedding space corresponding to the embedding space representation of the natural language user query. In some implementations, the method further includes altering the portion of embedding space corresponding to the additional intent based on the given portion of the embedding space corresponding to the embedding space representation of the natural language user query.

These and other implementations of the technology can include one or more of the following features.

In some implementations, the natural language user query is a negative example query provided by a human developer. In some versions of those implementations, prior to identifying the natural language user query, the method further includes identifying the semantic parser model is over-triggering for a corresponding agent. In some implementations, the method further includes causing a prompt to be displayed to the human developer indicating the semantic parser model is over-triggering. In some implementations, the method further includes identifying the natural language user query based on the negative example query, where the human developer provides the negative example query based on the prompt indicating the semantic parser model is over-triggering.

In some implementations, altering the portion of embedding space corresponding to the additional intent based on the given portion of the embedding space corresponding to the embedding space representation of the natural language user query includes deleting the given portion of the embedding space from the portion of the embedding space corresponding to the additional intent. In some versions of those implementations, subsequent to deleting the given portion of the embedding space from the portion of the embedding space corresponding to the additional intent, without retraining the semantic parser model, the method further includes identifying a further natural language user query, where the further query includes the additional intent and one or more arguments corresponding to the intent. In some implementations, the method further includes processing the further natural language user query using the semantic parser model to generate further structured data output. In some implementations, the method further includes determining, based on processing the further natural language user query using the semantic parser model, a further embedding space representation of the further natural language user query corresponds to the given portion of the embedding space representation deleted from the embedding space corresponding to the additional intent.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:

determining a semantic parser model is under-triggering for a given agent when used in conjunction with the given agent;

wherein the semantic parser model is utilized in conjunction with multiple agents, including the given agent;

in response to determining the semantic parser model is under-triggering, identifying a natural language user query, where the natural language user query includes an intent and one or more arguments corresponding to the intent, and wherein the user query is a positive example query corresponding to the given agent;

processing the natural language user query using the semantic parser model to generate structured data output;

determining, based on processing the natural language user query using the semantic parser model, whether an embedding space representation of the natural language user query corresponds to a portion of an embedding space corresponding to the intent;

in response to determining the embedding space representation of the natural language user query does not correspond to the portion of the embedding space corresponding to the intent:

identifying a given portion of the embedding space corresponding to the embedding space representation of the natural language user query; and altering, for the given agent, the portion of the embedding space corresponding to the intent based on the given portion of the embedding space corresponding to the embedding space representation of the natural language user query, wherein altering, for the given agent, the portion of the embedding space is based on the portion of the embedding space corresponding to the natural language user query and is based on the natural language user query being the positive example corresponding to the given agent, and wherein altering, for the given agent, the portion of the embedding space corresponding to the intent decreases the under-triggering of the semantic parser model for the given agent when used in conjunction with the given agent.

2. The method of claim 1, wherein altering, for the given agent, the portion of the embedding space corresponding to the intent based on the given portion of the embedding space corresponding to the embedding space representation of the natural language user query comprises:

adding the given portion of the embedding space to the portion of the embedding space corresponding to the intent.

3. The method of claim 2, further comprising:

subsequent to adding the given portion of the embedding space to the portion of the embedding space corresponding to the intent, without retraining the semantic parser model, identifying an additional natural language user query, where the additional natural language user query includes the intent and one or more arguments corresponding to the intent;

processing the additional natural language user query using the semantic parser model to generate additional structured data output; and determining, based on processing the additional natural language user query using the semantic parser model, an additional embedding space representation of the additional natural language user query corresponds to the given portion of the embedding space representation added to the portion of the embedding space corresponding to the intent.

4. A method implemented by one or more processors, the method comprising:

determining a semantic parser model is over-triggering for a given agent when used in conjunction with the given agent;

in response to determining the semantic parser model is over-triggering, identifying a natural language user query, where the natural language user query includes an intent and one or more arguments corresponding to the intent, and where the user query is a negative example query corresponding to the given agent;

processing the natural language user query using the semantic parser model to generate structured data output;

determining, based on processing the natural language user query using the semantic parser model, whether an embedding space representation of the natural language user query corresponds to a portion of the embedding space corresponding to an additional intent;

in response to determining the embedding space representation of the natural language user query corresponds to the portion of the embedding space corresponding to the additional intent:

identifying a given portion of the embedding space corresponding to the embedding space representation of the natural language user query; and altering, for the given agent, the portion of the embedding space corresponding to the additional intent based on the given portion of the embedding space corresponding to the embedding space representation of the natural language user query, wherein altering, for the given agent, the portion of the embedding space is based on the portion of the embedding space corresponding to the natural language user query and is based on the natural language user query being the positive example corresponding to the given agent, and wherein altering, for the given agent, the portion of the embedding space corresponding to the additional intent decreases the over-triggering of the semantic parser model for the given agent when used in conjunction with the given agent.

5. The method of claim 4, wherein altering, for the given agent, the portion of the embedding space corresponding to the additional intent based on the given portion of the embedding space corresponding to the embedding space representation of the natural language user query comprises:

deleting the given portion of the embedding space from the portion of the embedding space corresponding to the additional intent.

6. The method of claim 5, further comprising:

subsequent to deleting the given portion of the embedding space from the portion of the embedding space corresponding to the additional intent, without retraining the semantic parser model:

identifying a further natural language user query, where the further query includes the additional intent and one or more arguments corresponding to the intent;

processing the further natural language user query using the semantic parser model to generate further structured data output; and determining, based on processing the further natural language user query using the semantic parser model, a further embedding space representation of the further natural language user query corresponds to the given portion of the embedding space representation deleted from the embedding space corresponding to the additional intent.

7. The method of claim 1, wherein altering, for the given agent, the portion of the embedding space corresponding to the intent decreases the under-triggering of the semantic parser model without retraining the semantic parser model for the given agent.

8. The method of claim 4, wherein altering, for the given agent, the portion of the embedding space corresponding to the intent decreases the over-triggering of the semantic parser model without retraining the semantic parser model for the given agent.

9. The method of claim 1, wherein identifying the natural language user query is based on a human developer providing the positive example query.

10. The method of claim 9, further comprising:

subsequent to determining the semantic parser model is under-triggering for the given agent when used in conjunction with the given agent, causing a prompt to be displayed to the human developer, wherein the prompt indicates the semantic parser model is under-triggering for the given agent, and wherein the positive example query is provided by the human developer in response to the prompt.

11. The method of claim 4, wherein identifying the natural language user query is based on a human developer providing the negative example query.

12. The method of claim 11, further comprising:

subsequent to determining the semantic parser model is over-triggering for the given agent when used in conjunction with the given agent, causing a prompt to be displayed to the human developer, wherein the prompt indicates the semantic parser model is over-triggering for the given agent, and wherein the negative example query is provided by the human developer in response to the prompt.

* * * * *